United States Patent [19]

Bott

[11] 4,174,794

[45] * Nov. 20, 1979

[54] VEHICLE ARTICLE CARRIER

[76] Inventor: John A. Bott, 931 Lakeshore Dr., Grosse Pointe Shores, Mich. 48236

[ * ] Notice: The portion of the term of this patent subsequent to Oct. 25, 1994, has been disclaimed.

[21] Appl. No.: 798,576

[22] Filed: May 19, 1977

Related U.S. Application Data

[63] Continuation-in-part of Ser. No. 725,500, Sep. 22, 1976.

[51] Int. Cl.² .................................................. B60R 9/00
[52] U.S. Cl. ..................................... 224/320; 224/325; 224/328
[58] Field of Search .......... 224/29 R, 42.1 R, 42.1 D, 224/42.1 E, 42.1 F, 42.1 G; 280/179 R; 105/475, 478, 479, 480, 481, 482

[56] References Cited

U.S. PATENT DOCUMENTS

| 2,688,289 | 9/1954 | Sterling | 280/179 R X |
| 3,181,753 | 5/1965 | Fitch | 224/42.1 E X |
| 3,366,295 | 1/1968 | Nygaard | 224/42.1 E |
| 4,015,760 | 4/1977 | Bott | 105/478 X |
| 4,055,284 | 10/1977 | Bott | 224/42.1 D |

FOREIGN PATENT DOCUMENTS 2508217  1/1976  Fed. Rep. of Germany ........ 224/29 R Primary Examiner—Trygve M. Blix
Assistant Examiner—Winston H. Douglas
Attorney, Agent, or Firm—Harness, Dickey & Pierce

[57] ABSTRACT

An article carrier mounted on a generally flat exterior surface of an automotive vehicle and consisting of a plurality of spaced parallel slat assemblies which are fabricated, for example, of roll-formed sheet metal and are provided with fastening elements having a body that is located at least in part within the interior of the slats; the slats being formed with openings which provide access to the fastening elements in order that containers, tranvserse slats, or other article securing devices may be cooperable with the elements in securing articles to the article carrier. Additionally, removable cover members may be provided which are adapted to be inserted in the slat openings to close off either the entire opening such as when the article carrier is not in use or only unused portions of the opening.

14 Claims, 18 Drawing Figures

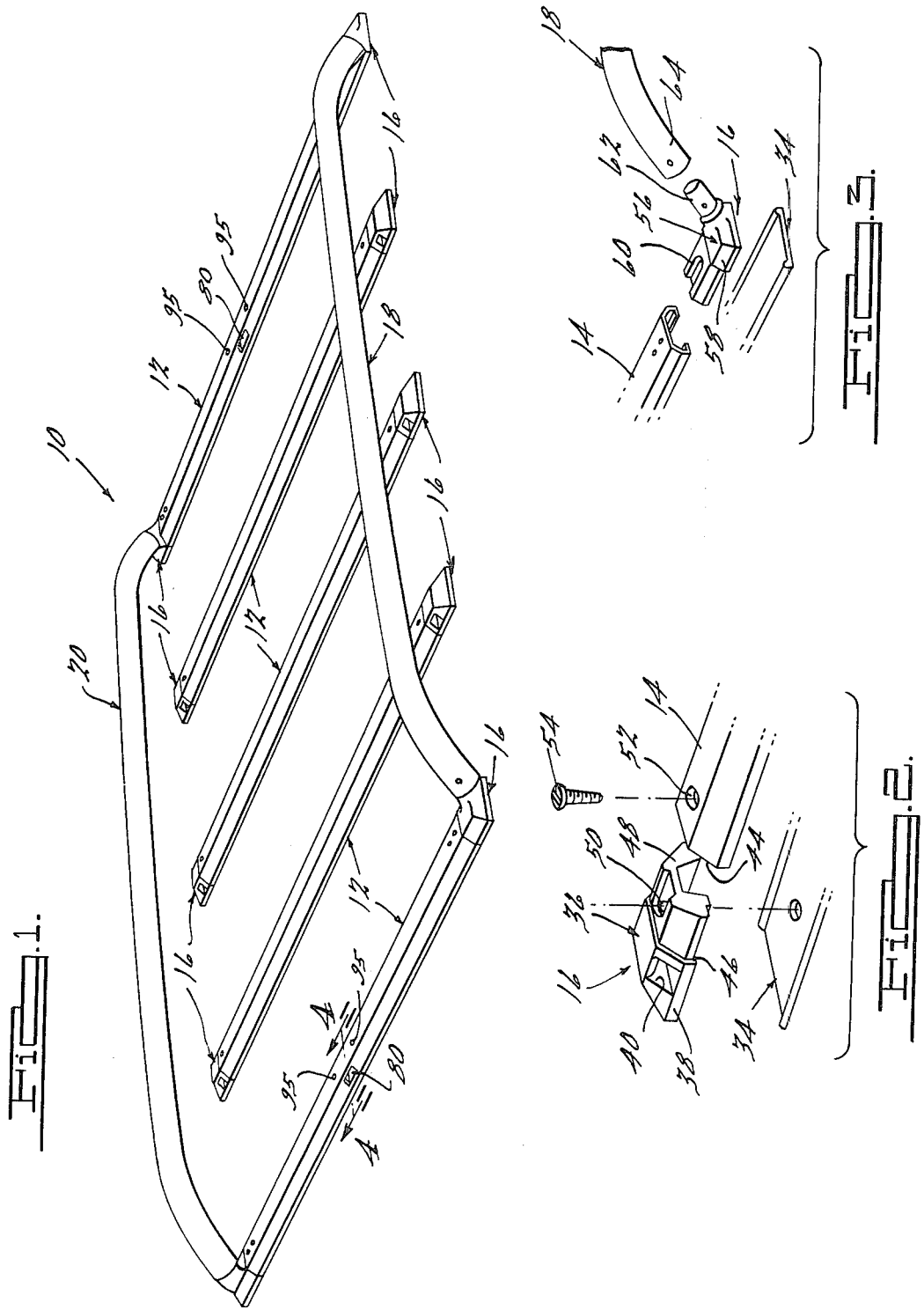

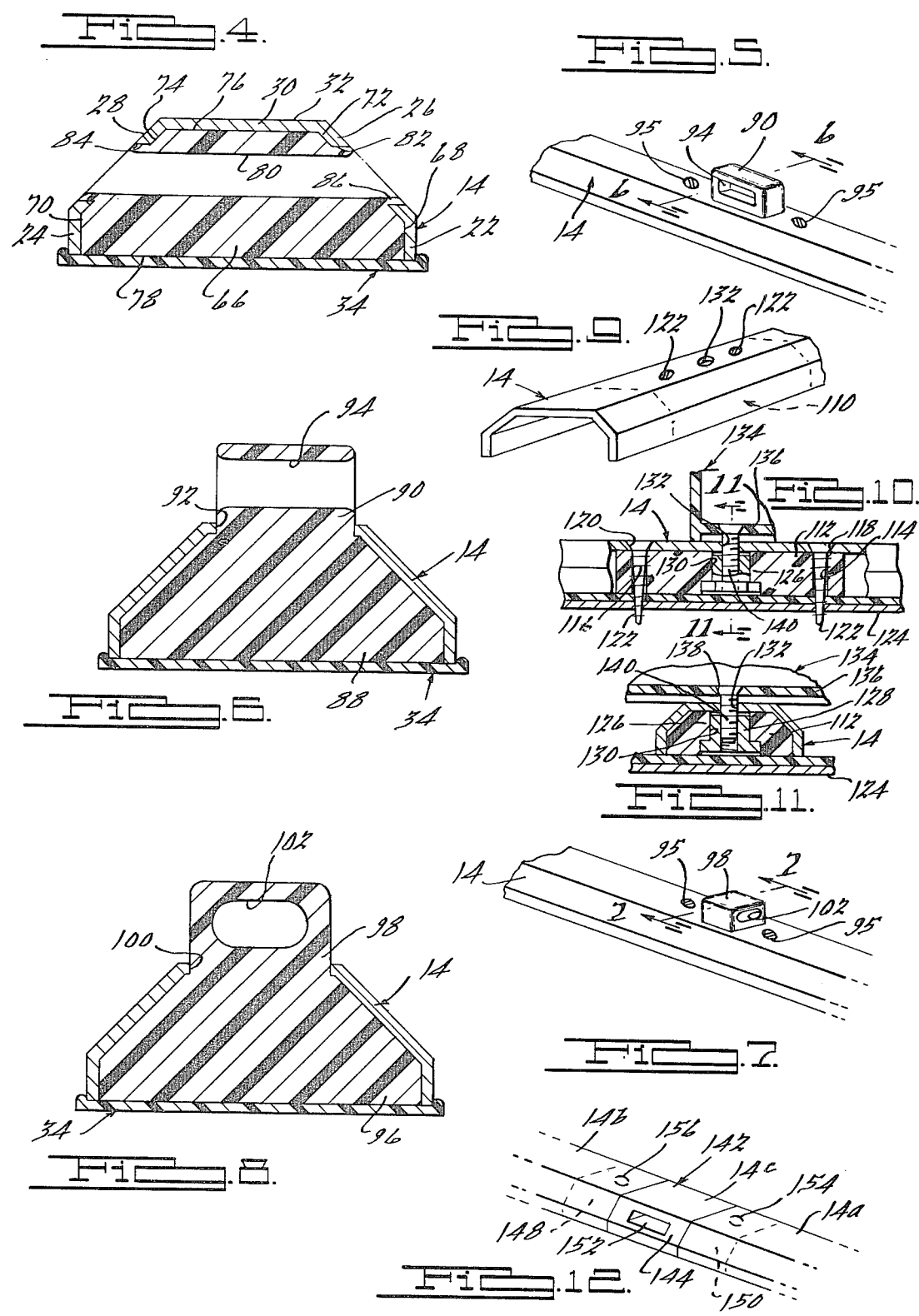

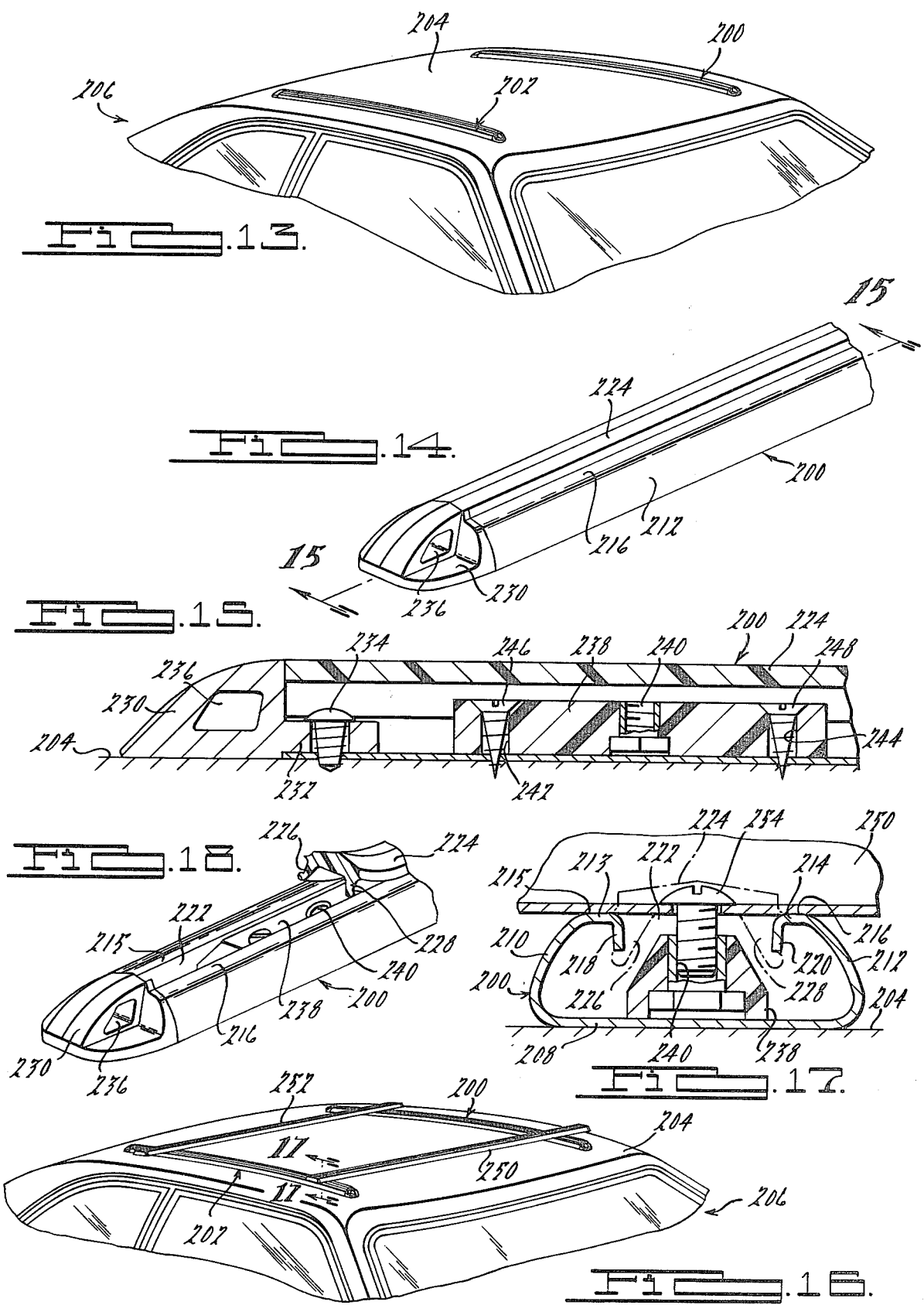

VEHICLE ARTICLE CARRIER

BACKGROUND OF THE INVENTION

This is a continuation-in-part of my application entitled Vehicle Article Carrier bearing Ser. No. 725,500 filed Sept. 22, 1976.

The present invention is directed generally to fastening devices for use with article carriers for automotive vehicles. More particularly, the present invention is directed to a new and improved fastening device adapted for use with the slat assemblies of article carriers of the type shown in U.S. patent application Ser. No. 604,643, filed Aug. 14, 1975, now U.S. Pat. No. 4,055,284.

SUMMARY OF THE INVENTION

The article carrier of the present invention consists of a plurality of slat assemblies each of which is fabricated of a roll-formed sheet metal, such as stainless steel, and which are adapted to be mounted in spaced parallel relationship on a generally flat surface portion of an associated automotive vehicle. The slat assemblies may be provided with article or load constraining side rails and/or an article carrying container for securing articles, such as boxes, luggage, etc., upon the carrier. In accordance with the present invention, certain of the slat assemblies have openings formed therein that provide access to fastening elements which have at least part of their body portions located interiorly of the associated slat assembly. In certain embodiments of the present invention, the fastening elements are located completely interiorly of the slat assembly and may include eyelet openings, while in other embodiments, eyelet openings associated with the fastening elements are located exteriorly of the associated slat assemblies.

BRIEF DESCRIPTION OF THE DRAWINGS

FIG. 1 is an elevated perspective view of an article carrier for an automotive vehicle and incorporating the principles of the present invention therein;

FIG. 2 is an exploded assembly view of one end of one of the slat assemblies incorporated in the article carrier shown in FIG. 1;

FIG. 3 is an exploded assembly drawing of one end of another of the slat assemblies incorporated in the article carrier of FIG. 1;

FIG. 4 is an enlarged transverse cross-sectional view taken substantially along the line 4—4 of FIG. 1;

FIG. 5 is an elevated perspective view of an alternate embodiment of a tie-down member incorporated in the article carrier of the present invention;

FIG. 6 is an enlarged transverse cross-sectional view taken substantially along the line 6—6 of FIG. 5;

FIG. 7 is an elevated perspective view similar to FIG. 5 and illustrates another embodiment of a tie-down member incorporated in the article carrier of the present invention;

FIG. 8 is an enlarged transverse cross-sectional view taken substantially along the line 8—8 of FIG. 7;

FIG. 9 is an elevated perspective view of another embodiment of the present invention;

FIG. 10 is enlarged enlraged transverse cross-sectional view of the structure shown in FIG. 9;

FIG. 11 is a transverse cross-sectional view taken substantially along the line 11—11 of FIG. 10;

FIG. 12 is an elevated perspective view of yet another embodiment of the present invention;

FIG. 13 is a perspective view of a portion of a vehicle having a pair of longitudinally extending slats in accordance with the present invention secured thereto;

FIG. 14 is an enlarged perspective view of a portion of one of the slats of FIG. 13;

FIG. 15 is a longitudinal sectional view of the portion of the slat of FIG. 14 taken along line 15—15 thereof;

FIG. 16 is a perspective view of a portion of a vehicle having a pair of longitudinally extending slats to which a pair of transversely extending slats are secured;

FIG. 17 is a cross-sectional view of the longitudinal and transverse slats of FIG. 16 taken along line 17—17 thereof; and FIG. 18 is a perspective view of a portion of a slat having a cover member partially installed therein all in accordance with the present invention.

DESCRIPTION OF THE PREFERRED EMBODIMENTS

Referring now in detail to the drawings and in particular to FIGS. 1-3 thereof, a vehicle article carrier 10, in accordance with one preferred embodiment of the present invention, is shown as comprising a plurality of spaced parallel slat assemblies 12 which are adapted to be fixedly secured to a substantially flat, horizontal surface portion of an associated automotive vehicle (not shown). Each of the slat assemblies 12 comprises a generally hollow roll-formed sheet metal slat 14 which is suitably secured to the associated vehicle surface and is provided with end members 16 at the opposite ends thereof. In the embodiment of the present invention illustrated in FIG. 1, the article carrier 10 includes a pair of load constraining side rails 18 and 20 which are arranged in spaced parallel relationship and extend generally perpendicular to the plurality of slat assemblies 12. As will hereinafter be described, the opposite ends of the rails, 18, 20 are secured to selected of the slat assemblies 12 via the associated end members 16, whereby to provide a unitized structure for carrying articles, such as boxes, luggage, and the like upon the associated vehicle surface.

As best seen in FIG. 4, each of the slats 14 comprises a pair of spaced parallel side walls 22, 24 which terminate at their upper edges in upwardly converging walls 26 and 28, respectively. Extending between the upper edges of the walls 26, 28 is a flat horizontally extending upper wall 30 which defines a horizontal support surface 32. The lower marginal edges of the side walls 22, 24 may be in-turned if desired (not shown) and are adapted to bear upon a suitable mounting pad, representatively designated by the numeral 34, which is coextensive of each of the slats 14 and is fabricated, for example, of a suitable resilient material, such as natural or synthetic rubber, or a suitable synthetic polymeric material.

With the exception of the end members 16 utilized in operatively supporting the side rails 18, 20, the end members 16 of the balance of the slat assemblies 12 constitute end caps 36 of the type shown in FIG. 2 and including a body 38 fabricated of a resinous plastic material, for example, by injection molding or the like. Each of the end caps 36 comprises a transversely extending opening or tie-down eyelet 40 which extends laterally therethrough and is adapted to engage the terminal end 44 of the associated slat 14 with a shoulder 46 defined around the outer periphery of a tongue portion 48 which is in turn adapted to be inserted into the interior of the associated slat 14. The tongue portion 48 is formed with a suitable central aperture 50 adapted to be aligned with a similar opening 52 within the adjacent end of the slat 14 for receiving a suitable fastening element, such as a screw, bolt, or the like 54 for operatively securing the end cap 36 within the adjacent end of the slat 14. It may be desirable to utilize a fastening element 54 of sufficient size (length) so that it may be threadably engaged directly with the portion of the associated vehicle upon which the carrier 10 is mounted, whereby such fastening element or screw 54 will serve the two-fold purpose of operatively securing the end cap 56 to the slat 14, and securing the adjacent end of the entire slat assembly 12 to the support surface, as will be appreciated by those skilled in the art and as indicated in the aforementioned copending patent application, Ser. No. 604,643.

The end members 16 operatively associated with the side rails 18, 20 are in the form of stanchion members 56, one of which is shown in detail in FIG. 3 as comprising a stanchion body 58 having a tongue portion 60 adapted to be operatively inserted into the end portion of the associated slat 14 and have suitable fastening means, such as the aforementioned fastening element 54, operatively secure the member 56 to the associated slat 14. The stanchion body 58 includes an upwardly extending, generally cylindrically shaped support portion 62 adapted to be telescopically received within the downwardly extending hollow end portion 64 of the associated side rails 18, 20, and means in the form of a suitable transversely extending screw, bolt, or the like (not shown) may be utilized for securing the side rail end portion 64 to the cylindrical stanchion portion 62, as will be appreciated by those skilled in the art.

In accordance with the principles of the present invention, it may be desirable to provide one or more of the slat assemblies 12 with intermediate tie-down devices, i.e., tie-down devices by which a suitable rope, strap, or similar securing device may be operatively secured to the slat assemblies 12, at some location thereon other than at the opposite ends thereof. Such a tie-down arrangement is best seen in FIGS. 4–8, and the embodiment shown in FIG. 4 includes a tie-down body 66 which is defined by side walls 68, 70, upwardly converging walls 72, 74, a top wall 76, and a bottom wall 78. The size and shape of the walls 68–78 are designed such that the body 66 is of the same transverse cross section as the interior of the associated slat 14. Accordingly, upon operative assembly of the body 66 into the associated slat 14, said body will assume the entire interior portion of the slat 14 along the length thereof occupied by the body 66, which length may typically be in the order of one to two inches of the overall length of the associated slat 14. The body 66 is formed with an eyelet opening 80 which is adapted to be aligned with openings 82 and 84 formed in the upwardly converging walls 26, 28 of the associated slat 14 upon assembly of the body 66 therein, whereby a suitable rope, strap, or the like may be inserted through the openings 82, 84 and eyelet opening 80 for securing said fastening device to the slat assembly 12. It is to be noted that the body 66 may be provided with a peripheral outwardly projecting portion 86 at each end of the eyelet opening 80 whereby to prevent chaffing or other undesirable wear of the securing device, i.e., rope, strap, etc., upon movement relative to the edges of the openings 82, 84 of the slat 14. One particularly important feature of the tie-down arrangement thus described resides in the fact that the entire tie-down body 66 is located interiorly of the associated slat 14, whereby to be completely concealed from view, with the exception of the eyelet openings thereof. Additionally, by virtue of being located within the slat 14, articles, such as boxes, luggage, etc., may be mounted upon the support surface 32 directly above the body 66.

FIGS. 5 and 6 illustrate an alternate embodiment of the present invention wherein a tie-down body 88 is located directly within an associated slat 14 and is intended to occupy the entire interior thereof throughout the length of the slat 14 in which the body 88 is disposed. The body 88 is provided with an integral upwardly extending portion 90 which projects through a suitable opening 92 in the top wall 30 of the associated slat 14, as illustrated in FIG. 6. The upwardly projecting portion 90 is formed with an eyelet opening 94 which is arranged generally transversely of the associated slat 14 and is adapted for cooperation with a suitable rope, strap, or similar article securing device, as will be appreciated by those skilled in the art.

As best seen in FIG. 5, means in the form of suitable threaded fastening elements 95 consisting of screws, bolts, or the like may be located on the opposite sides of the eyelet opening 94 and extend downwardly through the slat 14, the body 88, and be threadably engaged with the underlying vehicle body panel. Similar such fastening means may be utilized for securing the body 66 within the slats 12 in the embodiment of the present invention shown in FIG. 1, as indicated by the numeral 95.

FIGS. 7 and 8 illustrate a similar type tie-down arrangement wherein a tie-down body 96 is located within the slat 14 and includes an upwardly projecting portion 98 which extends through a suitable opening 100 in the top wall 30. The projecting portion 98 differs from the portion 90 in that the portion 98 is formed with an eyelet opening 102 which is arranged parallel to the length of the associated slat 14 (as opposed to transversely thereof). Suitable fastening means 95, such as the aforementioned screws, bolts, or the like, may be located on the opposite sides of the portion 98 for securing both the slat 14 and the body 96 to the underlying portion of the associated vehicle. Thus, it will be seen that the tie-down bodies may be varied in accordance with specified applications such that the eyelet openings thereof may extend either parallel or transversely of the associated slats and/or may be located above the slats or interiorly thereof, as in the case with the arrangement shown in FIG. 4. The various tie-down bodies may be fabricated of any suitable material, such as a molded plastic material, and the openings may be formed in the associated slats 14 by any convenient material forming operation, such as by a suitable stamping operation, as is well known in the art. It is to be noted that while only two of the intermediate tie-down devices are depicted in the article carrier 10 shown in FIG. 1, it will be readily appreciated that two or more such intermediate tie-down devices may be provided in any one of the slat assemblies 12, and that all of such assemblies or only certain selected ones thereof may be provided therewith, whereby to provide for universality of application in accordance with the particular type of articles to be carried.

The principles of the present invention are not limited solely to the concept of operatively associating an eyelet opening with an article carrying slat, as indicated in FIGS. 9–11, wherein a fastening element 110 is depicted for securing an article container or the like upon the associated slat, such as the aforementioned slat 14. The fastening element 110 includes a body 112 which is presumably of the same cross-sectional shape as the interior of the slat 14 and is located interiorly thereof, as best seen in FIGS. 10 and 11. The body 112 is formed with longitudinally spaced apart vertical bores 114 and 116 which are adapted to be aligned with openings or bores 118, 120, respectively, formed in the upper wall of the slat 14. With this arrangement, suitable screws, bolts, or other fastening devices 122 may extend downwardly through the aligned openings 114, 118 and 116, 120 and be threadably engaged with the underlying vehicle body panel, as designated by the numeral 124.

Disposed between the bores 114, 116 is a threaded portion, generally designated by the numeral 126. The threaded portion 126 may be provided by a variety of different means and is disclosed herein in the form of a riv-nut 128 which is cast or molded interiorly of the body 112 so as to define a vertical interiorly threaded bore 130 which is in turn vertically aligned with an opening 132 formed in the slat 114. As best seen in FIGS. 10 and 11, an article carrying container or the like representatively designated by the numeral 134 may be supported directly upon the upper side of the slat 14 (and various other slats, depending upon the size of the container). The container 134 is shown as having a bottom section 136 having an opening 138 formed therein, which opening 138 is vertically aligned with the opening 132 in the slat 14 such that a suitable fastening element 140 may extend downwardly through the openings 138, 132 and be threadably engaged with the riv-nut 128. It will be appreciated, of course, that the number of fastening elements 110 to be used with a particular container will vary with the size and shape of such container, as well as with the number and orientation of slats in a particular luggage carrier design. Accordingly, the present invention is not intended to be limited solely to the use of a single such element 110, since a multiplicity thereof may be required for containers or other types of article carriers of any substantial size.

FIG. 12 illustrates still a further embodiment of the present invention which is generally similar to the arrangement shown in FIGS. 1 and 4, but which is adapted to be utilized when two slat sections, herein designated 14a and 14b are arranged in longitudinal alignment. In particular, FIG. 12 illustrates a fastening element 142 having a body 144 which defines a central part 146 of the same general cross-sectional shape as the exterior of the slat sections 14a and 14b. The body 144 also includes a pair of outwardly extending end portions 148 and 150 which are presumably, although not necessarily, of the same transverse cross-sectional shape as the interior of the slat sections 14a and 14b and adapted to be received within the confronting ends thereof in the manner shown in FIG. 12. The central part 146 of the body 144 is formed with a transverse eyelet opening 152 which may be similar to the opening 40 previously described herein, and means in the form of suitable screws, bolts, or the like 154 may extend downwardly through the adjacent ends of the slat sections 14a and 14b, as well as through the end portions 148, 150 of the element 142 for operatively securing the entire assemblage to the underlying vehicle body panel.

Referring now to FIGS. 13 through 16, there is shown another embodiment of the present invention comprising a pair of slats 200 and 202 mounted in spaced parallel relationship to a portion 204 of a motor vehicle 206. It should be noted that while slats 200 and 202 are illustrated herein as being secured to a roof portion of a motor vehicle, they may be easily secured to any other relatively flat, preferably substantially, horizontal portion in like manner as described hereinafter. As slat members 200 and 202 are substantially identical, only one such slat is illustrated and will be described in detail with reference to FIGS. 14 through 16 and 18.

As illustrated, slat 200 comprises a lower vehicle engaging portion 208 with laterally disposed upwardly extending converging sidewall portions 210, 212 and generally horizontally inwardly extending upper wall portions 213, 214 defining article supporting surfaces 215, 216. A pair of spaced depending flange portions 218, 220 extend interiorly of slat member 200 from each of upper wall portions 213 and 214 and define a longitudinally extending opening 222 therebetween which is coextensive of slat 200. A cover member 224 is also provided having portions 226, 228 adapted to be inserted within opening 222 so as to close off the interior of slat 200 at such time as they are not being used in their capacity as article carriers so as to prevent entry of dirt, snow, ice or the like. As shown therein, cover member 224 may be coextensive with the length of slat 200. However, it should be noted, that should it be desirable, cover member 224 may be easily fabricated in suitable lengths to enclose portions of opening 222 which are not being used when the article carrying members hereinafter described are installed in operative relationship to slats 200 and 202.

An end cap 230 is also provided which has a tab portion 232 projecting into the interior of slat member 200 and is adapted to be secured therein by a fastener 234 extending therethrough which also acts to secure slat member to the vehicle. End cap 230 may be of any desired shape and may be provided with an eyelet 236 extending therethrough so as to facilitate the attachment of ropes or straps which may be used to secure an article to the carrier.

As best seen in FIGS. 15 and 17, a fastening element 238 is disposed within the interior of slat 200 in spaced relationship to sidewalls 210, 212, upper wall portions 213, 214 and flange portions 218, 220 and comprises an elongated member having a threaded portion 240 provided therein such as for example a riv-nut embedded therein. Fastening element 238 has a pair of spaced holes 242, 244 provided therein adapted to receive screws 246, 248 each commonly securing the fastening element to the slat as well as securing the slat to a portion of the motor vehicle. Threaded portion 240 of the fastening element 238 is adapted to receive securing means associated with article carrying means so as to retain article carrying means in position upon article supporting surfaces 215, 216 of the slat member 200.

As shown in FIG. 16, the article carrying means comprises a pair of transversely extending slat members 250, 252 which may be removably installed across parallel slats 200 and 202. Article carrying means 250, 252 are adapted to be secured by threaded fasteners 254 which threadedly engage threaded portion 240 of the fastening element 238 thereby clamping the article carrying means in position upon article supporting surfaces 215, 216 of slat 200 and corresponding surfaces of slat 202. Thus, when article carrying means 250, 252 are installed in transverse relation to longitudinally extending slat members 200, 202, they provide a surface for supporting and securing any desired article to the motor vehicle. It should be noted that while only two such article carrying means 250, 252 are shown secured adjacent opposite ends of each of the slat members 200 and 202, any number of such article carrying means may be secured to the longitudinally extending slat members in like manner so as to form a desired load supporting surface upon the portion of the motor vehicle. Further should it be desired, any number of fastener elements 238 may also be provided within each of longitudinally extending slats 200, 202 so as to allow a pair of article carrying means 250, 252 to be mounted in varying spaced apart relationship. When the article carrier is not in use, article carrying means 250, 252 may be easily removed by merely removing the securing means 254. Cover member 224 may then be installed in opening 222 so as to prevent snow, ice or other debris from accumulating in the article supporting slats 200, 202. Further, as the article carrier requires only two article supporting slats to be secured to the vehicle, it presents a clean uncluttered appearance which does not detract from the lines of the vehicle. Also, the cover member, in addition to preventing debris, snow or ice from entering the channel portion of the slat members which could prevent installation of the article carrying means thereon, also performs a decorative function enhancing the appearance of the slats. It should also be noted that should it be desired, the cover members may be sectioned and so as to allow them to be installed between article carrying means thus, also providing a means for preventing the accumulation of snow or ice when the carrier is in use.

While it will be apparent that the preferred embodiments of the invention disclosed are well calculated to provide the advantages above stated, it will be appreciated that the invention is susceptible to modification, variation and change without departing from the proper scope or fair meaning of the subjoined claims.

I claim:
1. In an article carrier for an automotive vehicle:
   an article supporting slat mounted on a portion of the vehicle having a lower surface, upwardly extending sidewalls having converging portions, and an article supporting upper surface, said article supporting upper surface containing an elongated opening therein;
   a fastening element located within said slat and fixedly secured with respect thereto and securing means associated with article carrying means, said fastening element being adapted to secure said securing means in order to attach said article carrying means to said article supporting slat;
   a cover member normally disposed in an operative position partially within said elongated opening, and closing at least a portion of said opening, said cover member being at least partially removable to an inoperative position; and
   said fastening element being at least partially concealed from view when said cover member is disposed in said operative position and being accessible at such time as said cover member is moved to said inoperative position.

2. An article carrier as set forth in claim 1 wherein said fastening element is secured within said slat in a spaced relationship to said sidewalls and said upper surface.

3. An article carrier as set forth in claim 1 wherein elongated opening extends longitudinally in said slat, said opening being coextensive with said slat.

4. An article carrier as set forth in claim 3 further comprising end cap members interfitted with opposite longitudinal ends of said slat, said end cap members being operative to close said ends of said slat.

5. An article carrier as set forth in claim 1 wherein said fastening element and said slat are secured to said vehicle by a single fastener.

6. An article carrier as set forth in claim 1 wherein said opening is defined by a pair of depending flange portions extending interiorly of said slat and said cover member includes resilient portions cooperating with said flange portions to retain said cover member in position.

7. An article carrier as set forth in claim 1 further comprising:
   a second article supporting slat mounted in spaced substantially parallel relationship to said article supporting slat and having a lower surface, article converging sidewalls, and an aritcle supporting upper surface having an elongated opening therein;
   at least one fastening element secured within said second slat;
   article carrying means supported on said article supporting surfaces of said slat and said second slat; and
   said article carrying means including securing means extending through said opening and cooperating with respective of said fastening elements to retain said article carrying means in position on said article supporting surfaces.

8. An article carrier as set forth in claim 7 wherein said article carrying means comprise at least one cross member extending between said slat and said second slat.

9. An article carrier as set forth in claim 8 wherein said fastening element includes threaded portions aligned with said openings.

10. An article carrier as set forth in claim 9 wherein said securing means comprise a threaded fastener engaging said threaded portion of said fastening elements.

11. An article carrier as set forth in claim 7 wherein said slat extends longitudinally of said vehicle and said cross member extends transversely.

12. An article carrier as set forth in claim 1 wherein said fastening element and said slat are secured to said vehicle by a plurality of common fasteners.

13. An article carrier for an automotive vehicle comprising:
   a pair of substantially parallel spaced article supporting slats secured to a portion of said vehicle, each of said slats having a lower portion, upwardly extending sidewalls having converging portions and a pair of spaced upper article supporting surface portions defining a longitudinally extending opening;
   a plurality of fastening elements located interiorly of and fixedly secured with respect to each of said slats, each of said fastening elements being spaced from said sidewalls and said article supporting surface portions;
   a pair of article carrying means extending at generally right angles to said article supporting slats and being supported on said upper article supporting surface portions thereof;

securing means associated with said article supporting slats, said securing means extending into said article supporting slats and cooperating with respective of said fastening elements to secure said article carrying means on said article supporting slats; and a removably disposed cover member associated with each of said article supporting slats, said cover member having portions detachably engaged to said associated article supporting slat, said cover member at least partially concealing said fastening elements of said associated article supporting slat from view and providing access for said securing means of said associated article supporting slat to said fastening elements of said associated article supporting slat when removed from said associated article supporting slat.

14. An article carrier as set forth in claim 13 wherein each of said cover members is removably disposed in part within each of said longitudinally extending openings and operative to close at least a portion of said opening.

* * * * *

UNITED STATES PATENT AND TRADEMARK OFFICE
CERTIFICATE OF CORRECTION

PATENT NO. : 4,174,794
DATED : November 20, 1979
INVENTOR(S) : John A. Bott

It is certified that error appears in the above-identified patent and that said Letters Patent are hereby corrected as shown below:

Column 1, line 65, "enlarged enlraged" should be --an enlarged--.
Column 8, line 22, (Claim 7) "article" should be --upwardly--.
Column 8, line 23, (Claim 7) "aritcle" should be --article--.

Signed and Sealed this

First Day of April 1980

[SEAL]

Attest:

SIDNEY A. DIAMOND

Attesting Officer    Commissioner of Patents and Trademarks